(12) United States Patent
Yang et al.

(10) Patent No.: US 8,767,591 B2
(45) Date of Patent: Jul. 1, 2014

(54) MULTI-POINT VIDEO CONFERENCE SYSTEM AND MEDIA PROCESSING METHOD THEREOF

(75) Inventors: Yong Yang, Shenzhen (CN); Chun Yang, Shenzhen (CN); Yilin Cao, Shenzhen (CN); Kun Ding, Shenzhen (CN); Mingshi Huang, Shenzhen (CN); Xiaodong Gong, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 1901 days.

(21) Appl. No.: 11/830,057

(22) Filed: Jul. 30, 2007

(65) Prior Publication Data
US 2007/0273755 A1 Nov. 29, 2007

(51) Int. Cl.
*H04L 12/16* (2006.01)
*H04Q 11/00* (2006.01)
*H04N 7/14* (2006.01)
*G06F 15/16* (2006.01)

(52) U.S. Cl.
USPC ........ 370/260; 370/261; 370/263; 348/14.08; 348/14.09; 709/246

(58) Field of Classification Search
None
See application file for complete search history.

(56) References Cited

U.S. PATENT DOCUMENTS

| | | | | |
|---|---|---|---|---|
| 6,122,259 | A * | 9/2000 | Ishida | 370/260 |
| 6,577,605 | B1 * | 6/2003 | Dagate et al. | 370/270 |
| 6,944,166 | B1 * | 9/2005 | Perinpanathan et al. | 370/401 |
| 2002/0033880 | A1 * | 3/2002 | Sul et al. | 348/14.09 |
| 2003/0014488 | A1 | 1/2003 | Dalal et al. | |

(Continued)

FOREIGN PATENT DOCUMENTS

| | | |
|---|---|---|
| CN | 1372416 A | 10/2002 |
| CN | 1553676 A | 12/2004 |

(Continued)

OTHER PUBLICATIONS

International Search Report issued for related application No. PCT/CN2005/002025.

(Continued)

*Primary Examiner* — Alpus H Hsu
*Assistant Examiner* — Yee Lam
(74) *Attorney, Agent, or Firm* — McClure, Qualey & Rodack, LLP

(57) ABSTRACT

This invention discloses a multi-point video conference system and the media processing method thereof. The multi-point video conference system includes a softswitch, an application server and terminals. The softswitch is responsible for protocol adaptation and calling process, and performing the interconnection with other systems as an external interface of the conference system. The application server is responsible for service logic control and charging. The characteristic of this invention lies in that: the terminals behaved as conference participants including a conference chairman and ordinary conference members. Any terminal registered on the softswitch could be a conference member, and the conference chairman must be a SIP soft terminal with video conference service capability in order to realize the media control. The invention realizes the media control on the basis of the soft terminal behaved as the conference chairman, therefore any terminal user that has registered on the softswitch can initiate or participate a multi-point video conference, and the participant terminal number of the video conference is not limited.

7 Claims, 3 Drawing Sheets

(56) References Cited

U.S. PATENT DOCUMENTS

| | | |
|---|---|---|
| 2003/0058836 A1* | 3/2003 | Even .............................. 370/352 |
| 2003/0103135 A1* | 6/2003 | Liu ............................ 348/14.09 |
| 2003/0147357 A1* | 8/2003 | Zhang et al. .................. 370/260 |
| 2003/0190032 A1 | 10/2003 | Ravishankar |
| 2005/0015495 A1 | 1/2005 | Florkey et al. |
| 2005/0198261 A1* | 9/2005 | Durvasula et al. ............ 709/224 |
| 2006/0056440 A1* | 3/2006 | Khartabil ...................... 370/447 |
| 2006/0066717 A1* | 3/2006 | Miceli ........................ 348/14.09 |
| 2007/0005804 A1* | 1/2007 | Rideout ........................ 709/246 |
| 2007/0065122 A1* | 3/2007 | Chatterton .................... 386/126 |
| 2010/0110938 A1* | 5/2010 | Gavish et al. ................. 370/260 |

FOREIGN PATENT DOCUMENTS

| | | |
|---|---|---|
| EP | 1372302 A2 | 12/2003 |
| KR | 200051190 | 8/2000 |
| KR | 2003 0021222 | 3/2003 |
| RU | 2 240 657 C1 | 11/2004 |

OTHER PUBLICATIONS

Schmidt et al., "Global Serverless Videoconferencing Over IP," *FGCS*, pp. 219-227, vol. 19:2 (2003).

Supplementary European Search Report dated Sep. 30, 2008 issued in corresponding European Application No. 05 81 4110.

* cited by examiner

MULTI-POINT VIDEO CONFERENCE SYSTEM AND MEDIA PROCESSING METHOD THEREOF

CROSS REFERENCE RELATED APPLICATIONS

This application is a bypass continuation, which claims the benefit of priority from International Application No. PCT/CN2005/002025, filed Nov. 28, 2005, which claims the benefit of priority from Chinese Patent Application No. 200510038304.8, both of which are entirely incorporated herein by reference.

This application claims the benefit of priority from International Application No. PCT/CN2005/002025 filed Nov. 28, 2005, which claims the benefit of priority from Chinese Patent Application No. 200510038304.8 filed Feb. 6, 2005. Application Nos. PCT/CN2005/002025 and 200510038304.8 are incorporated by reference.

TECHNICAL FIELD

This invention relates to video conference technology, especially to a multi-point video conference system and a media processing method thereof.

BACKGROUND OF THE INVENTION

The video conference system is the product of the combination of multimedia computer technology and communication technology. Integrated with multimedia and networking communication technology, the video conference system provides an environment to people at different locations to discuss problems and work in cooperation.

The system integrates the computer interaction, communication distribution and television authenticity, having evident superiority, thereby becoming a hot spot in computer field nowadays.

The early video conference system standard ITU-T H.320 is worked out by ITU-T (International Telecommunication Union-Telecommunication Standardization Sector) in 1990. It is the fundamental standard for video conference system that based on electric circuit exchange bearing. With the development of TCP/IP technology, ITU-T came up with a new standard ITU-T H.323 in 1996. This new standard is video conferencing standard based on IP transmission network bearing, which is defined on general network architecture and has nothing to do with specific networks, therefore greatly extending its application range.

From the perspective of product, the H.323 video conference systems are varied and excelled with their own strong points, however, the products from different manufacturers are weak in interconnection and interworking, bringing inconvenience to the establishment of large-scale H.323 video conference system network. Within the current H.323 standardized video conference system, the MCU (Multi-point Control Unit) core-based media controller is responsible for transmitting audio and image data between each terminal. The number of terminals that the existing video conference system can hold is determined by the MCU capability, so in order to increase the users number, the MCU configuration must be improved. Therefore, the high investment including other hardware devices will inevitably influence the wide application of the video conferencing system.

The SIP standard is proposed by IETF (The Internet Engineering Task Force) organization in 1999. Its application goal is to realize real-time data, audio and video communication based on internet environment. Compared to H.323, the SIP (Session Initiation Protocol) is relatively easy and unrestrained, manufacturers can use existing network resources to deploy multimedia communication service, so it is able to construct a system satisfying the application needs with a low cost. Strictly speaking, SIP standard is a signaling standard that can realize real-time multimedia application. It adopts text-based encoding method and possesses large flexibility, expandability and cross-platform compatibility under point-to-point application environment. However, SIP protocol itself does not support multi-point conference function as well as management and control function, thus it is hard to meet the multi-point communication needs only by applying SIP system.

Therefore, a concept of "SIP video application server" is raised in the current SIP-based software video conference solutions. This application server is comprised of a Focus, a Media Policy server and a Conference Policies server. By using appropriate Media Policy and Conference Policies, the Focus can form the overall management control and media transmission solution of a conference, being responsible for conference management, media distribution and transmission. To a certain extent, the function of the Focus is similar to that of the MCU in the H.323 based video conference system. The system continues to use traditional C/S architecture and needs specialized media control server to control and process media. The capability of the server will determine the number of users that the system can support.

SUMMARY OF THE INVENTION

The purpose of this invention is to provide a multi-point video conference system and a media processing method thereof. It can realize multi-point video conference without the MCU in traditional video conference, and at the same time it is easy in network construction, convenient and reliable in implementation.

In order to achieve the above goal, the invention provides a multi-point video conferencing system, including a softswitch, an application server and terminals. The softswitch is responsible for protocol adaptation, calling process and working as a system external interface in interconnecting and interworking with other systems. The application server is responsible for service logic control and charging. This invention is characterized in that the terminals behaving as conference participants include a conference chairman and ordinary conference members. Any terminal that has registered on the softswitch can be conference members. The conference chairman must be a SIP soft terminal that possesses video conference service capability in order to realize media control.

In the above system, the terminal that behaved as the conference chairman is a software terminal with multimedia control and processing capability. The terminal is set up with SIP module and is used to carry out SIP talk with softswitch and application server. The terminal is also installed with audio processing module and video processing module.

In the above system, the terminal behaving as the conference chairman is responsible for conference scheduling work, including launching the conference, inviting members to join the conference and ending the conference. The terminal behaving as the conference chairman captures local audio and video while at the same time receives audio and video media packets from other conference members, the media packets received will be processed by media processing unit within terminals.

In the above system, the audio processing module within the terminal behaving as the conference chairman is responsible for capturing local audio and then synthesizing, distributing and transmitting the audio received from other conference members. The video processing module is responsible for capturing local video, as well as receiving video from other multi-channel conference members for video synthesis and transmission.

In the above system, the video processing module within the terminals behaving as ordinary conference members is responsible for video segmentation and display.

In the above system, the calling protocol includes, but is not limited to, SIP, MGCP or H.248. The terminals are SIP terminal, H.248 terminal or MGCP terminal.

In order to better achieve the above goal, this invention also provides a media processing method of multi-point video conference system. While within the existing networks, it segments the multi-point video conference system into multiple groups of relatively independent SIP session between conference chairman and a number of ordinary conference members. Each group of session independently performs calling process and media cooperation. After the calling and called parties are connected successfully in multiple groups of SIP calls, the terminal behaving as conference chairman will complete media processing and respectively distributes and transmits the processed media stream to the numbers of conference members. The said media processing utilizes end-to-end architecture.

In the above method, the media processing is comprised of audio processing steps and video processing steps. The audio processing steps are as follows: groups of SIP session work independently on audio media negotiation. After the session starts, the conference chairman will simultaneously receive audio from numbers of the other conference members, and then decode them according to corresponding coding method. Meanwhile, the chairman will capture local audio and process it according to different audio processing schemes for itself and other conference members.

In the above method, when the conference members comprise a conference chairman and ordinary conference member 1, member 2 and member 3, then the audio processing scheme will be: synthesize the audio of member 1, member 2 and member 3 and then broadcast it locally; synthesize the audio of the chairman, member 2 and member 3, encode it according to the audio format negotiated between the chairman and member 1, and then send it to member 1; synthesize the audio of the chairman, member 1 and member 3, encode it according to the audio format negotiated between the chairman and member 2, and then send it to member 2; synthesize the audio of the chairman, member 1 and member 2, encode it according to the audio format negotiated between the chairman and member 3, and then send it to member 3.

In the above method, the video processing steps are as follows: within the media negotiation process of the multiple groups of SIP session, the conference chairman negotiates the video as format one; after the session is set up, the chairman decodes the multi-channel video from other conference members and samples it into format two, meanwhile, the chairman samples the locally captured video into format two, then synthesizes the two into one complete frame of format one video to be sent to a number of other conference members; the conference members decode the received video and then segment out other members' video and display it on multi-screens.

In the above method, while the conference members are comprised of a conference chairman and common conference member 1, member 2 and member 3, the format one is QCIF format, the format two is one-fourth QCIF format.

The invention of multi-point video conference system and its media processing method is easy in network construction and the system has sound practicality and scalability. The calling process of this invention is realized on the basis of SIP protocol, which is much easier and unrestrained compared to H.323. Meanwhile, the media control and processing is completed by the user terminal behaving as the conference chairman, so it is feasible to construct a system that meets application needs within the existing NGN networks, as such the operators can realize large-scale service promotion and application in a convenient way.

The media control of this invention is realized by the soft terminal behaving as the conference chairman, therefore any terminal user that has registered on the softswitch can launch or participate in a multi-channel, multi-point video conference. However, in the traditional H.323-standard based video conference system, the terminal number it can hold is limited to the capability of MCU.

The soft terminal of this invention has the capability of simultaneously performing multi-channel SIP session, as well as media control functions like media synthesis, distribution, transmission and segmentation. It is obvious that in light of the strong protocol adaptation capability, the terminals used by conference members are not limited to the common SIP software or hardware terminals, but are also suitable for H.323 terminals.

The service logic of this invention is controlled by application server which is built on the basis of Parlay/OSA architecture. Because of the openness of Parlay/OSA standard, the service logic can be realized in a more flexible and convenient way, being able to meet demands of different customer groups. Also, the application server has reliable and flexible charging policy and can develop corresponding charging program according to the needs of service and operators.

PREFERRED EMBODIMENTS

Figure 1:
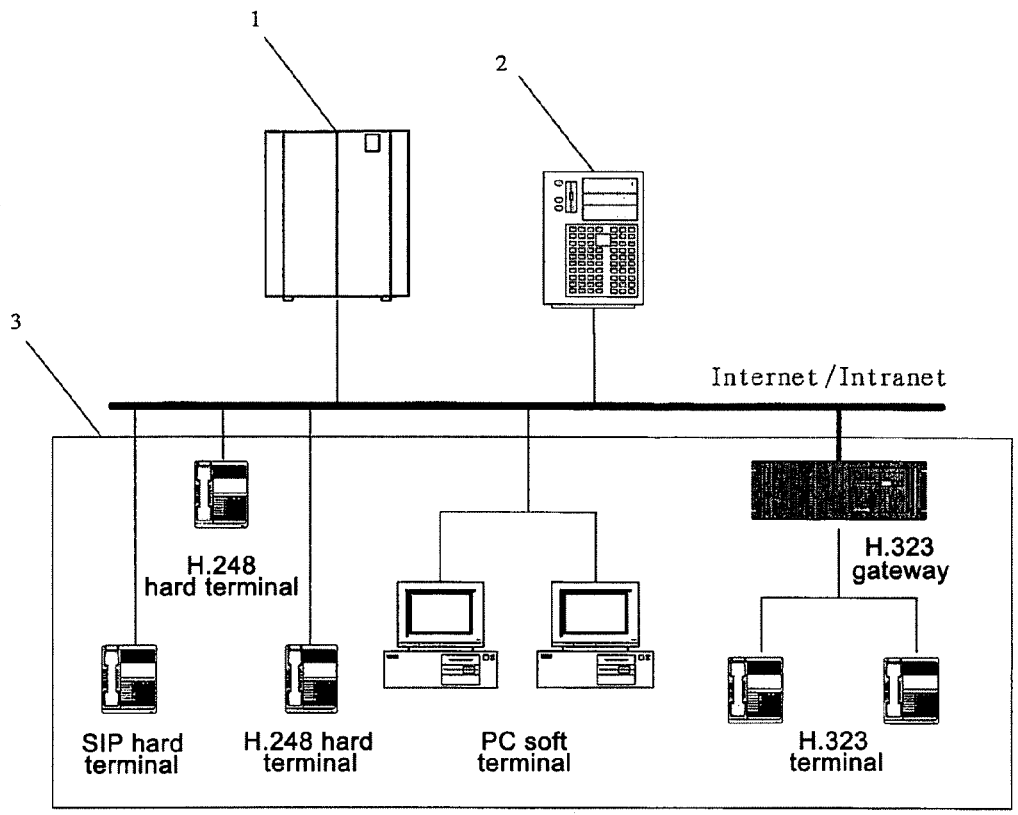
FIG. 1 is the structure chart of the multi-point video conference system according to this invention.

FIG. 1 is the system structure chart of the multi-point video conference system of this invention. As it is shown in FIG. 1, the system of this invention comprises softswitch 1, application server 2 and terminals 3.

The softswitch 1 is mainly responsible for the following functions:

receiving registration of terminals 3, wherein, the SIP soft terminal or hard terminal directly registers on softswitch 1, the H.323 terminal registers on the softswitch through H.323 gateway;

protocol adaptation and calling process, realizing adaptation of protocols such as SIP, H.248 and MGCP (Media Gateway Control Protocol), and at the same time receiving and forwarding the calling signaling.

The application server 2 is based on the development of Parlay/GSA standard, and it integrates a SIP calling agency service module to realize the following functions:

authorization and authentication of terminal users, only those terminal users that are authorized and authenticated by the application server 2 can launch a multi-channel, multi-point video conference, otherwise they can only be invited to join the conference as conference members;

service logic control and charging, accepting conference application (XML language) from conference chairman, segmenting it into groups of SIP session, then sending SIP information to softswitch 1 through its internal SIP calling agency service module, at the same time, being responsible for conference real-time charging after the communication is set up.

The terminals 3 comprise: SIP soft terminal or common SIP hard terminal, H.248 terminal, MGCP terminal or H.323 terminal (H.323 terminal connects with softswitch1 through H.323 gateway), wherein the common SIP hard terminal and H.323 terminal can only be invited to join the conference as ordinary conference members, while the SIP soft terminal can either launch a conference as a conference chairman or can be invited to join in the conference as an ordinary conference member.

The softswitch 1 and application server 2, softswitch 1 and SIP terminals, as well as application server 2 and its authorized and authenticated SIP soft terminals are all interactive according to standard SIP protocol, wherein when one SIP soft terminal proposes a conference request, it will seal the XML-language-based conference request in SIP MESSAGE source code and then send it to the application server.

The example embodiment will be explained by a four-channel conference. The single conference of the system can support four channel multi-point audio and video communications, the conference number is not limited, and all the terminals that have registered on the softswitch can participate in the four-channel multi-point video conference launched by the SIP soft terminal.

Figure 2:
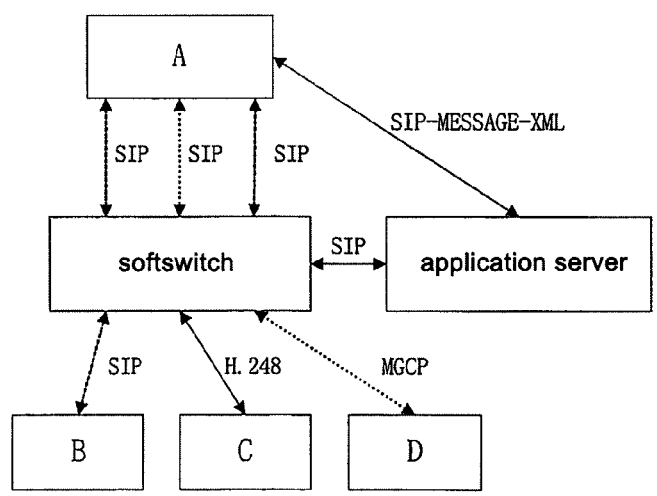
FIG. 2 is the flowing chart of calling process according to the method of this invention.

As it is shown in FIG. 2, within the four-channel multi-point video conference, the calling process is segmented into 3 relatively independent groups of SIP session, the process is as follows:

1) the terminal A that behaved as conference chairman sends a conference-launching request that is based on XML language to the application server, and asks for starting a four-channel video conference between A and users B, C, D;

2) the application server segments the received XML information, makes the conference chairman A as the caller to send SIP request to the softswitch so as to set up calling between terminal A and B, C, D respectively;

3) the softswitch controls and processes calling signaling and then builds up the calling between A and B, A and C, A and D; and 4) when B, C or D suspends, A can continue to invite other user terminals to join the conference through the application server; when A suspends, the application server will be informed to close the conference.

The transmission of media is completed by UDP (User Datagram Protocol) based RTP (Real-time Transport Protocol). RTP is a transmission protocol used on Internet for multimedia data stream. It is defined as working under one-to-one or one-to-many transmission condition with the goal of providing time information and realizing stream-synchronization. When an application program starts a RTP session, it will use two ports: one to RTP and the other to RTCP (Real-time Transport Control Protocol). RTP itself can not provide reliable transmission mechanism for sequential transmission of data packets, nor does it provide flow control or congestion control, whereas it depends on RTCP to provide these services.

Figure 3:
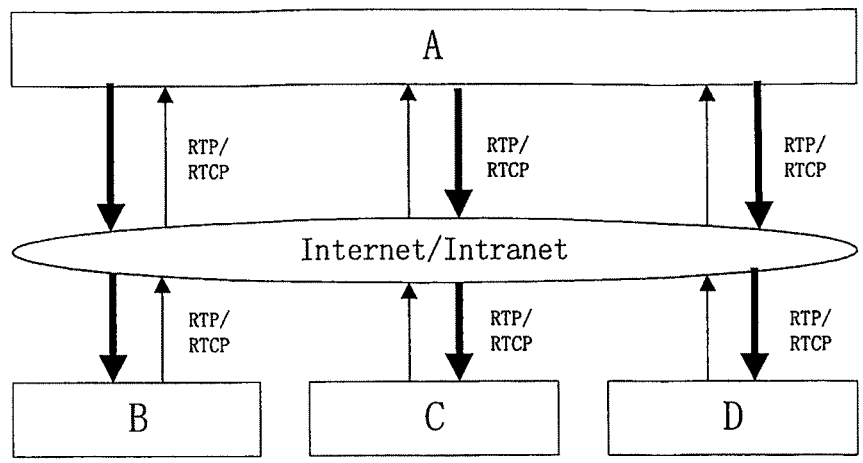
FIG. 3 is the flowing chart of media transmission according to the method of this invention.

As it is shown in FIG. 3, the four-channel audio synthesis and video processing are performed by user terminal A that is behaving as the conference chairman. The audio and video encoding/decoding are all realized by software. The audio encoding/decoding supports G.711, G.729 and G.723, and the video encoding/decoding employs H.263 standard and QCIF format.

1) For conference chairman A, after it sets up calling with B, C and D, it will simultaneously open up three groups of media channels, with each group opening two pairs of RTP and RTCP ports simultaneously for receiving audio media packets and video media packets from B, C, and D respectively. Meanwhile, A will send processed audio and video media packets to the ports that are designated by B, C and D;

2) After the terminals B, C and D behaving as conference members set up callings with A respectively, they will open up two pairs of RTP and RTCP ports respectively to receive audio and video media packets from A, and at the same time send locally captured audio media packets and video media packets to the ports that are designated by A. As for terminals B, C and D, this process is no difference to ordinary point-to-point video phone.

Figure 4:
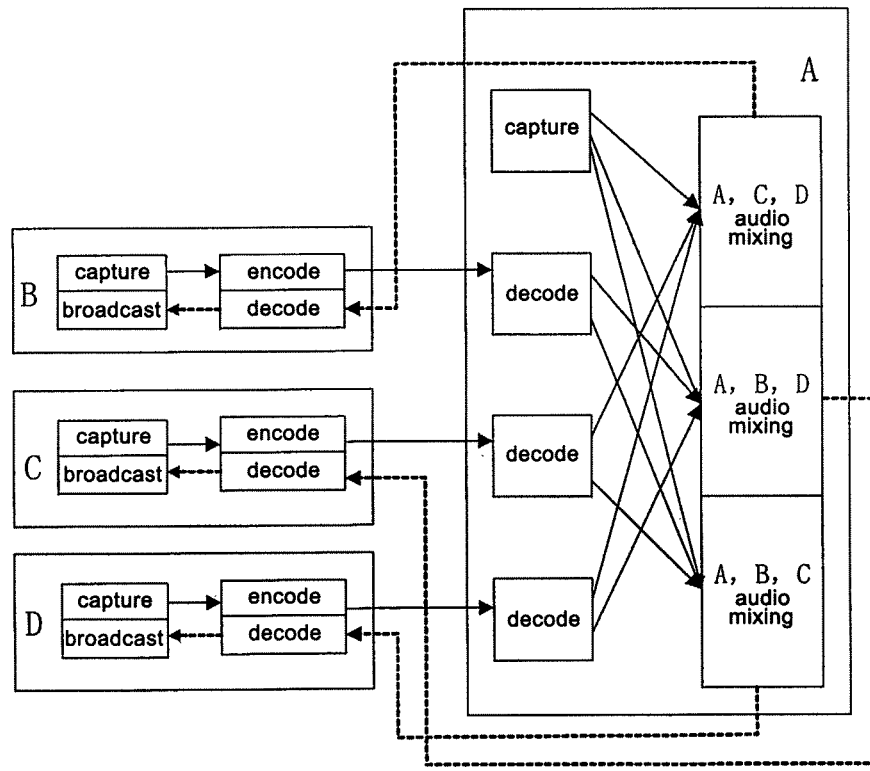
FIG. 4 is the flowing chart of audio processing according to the method of this invention.

The audio encoding and decoding of this invention supports G.711, G.729 and G.723. The process of audio processing is shown in FIG. 4: after the SIP session is set up between A and B, C, D, 1) the ordinary conference members B, C and D capture local audio respectively, compress and encode the data and then send it to conference chairman A;

2) the conference chairman A captures local audio, and at the same time receives three-channel audio from conference members B, C and D for being decoded;

3) the conference chairman A mingles the decoded B, C, D audio and broadcasts it through loudspeaker; mixes the local audio with audio from C and D, and sends it to B after being compressed and encoded; mixes the local audio with audio from B and D, and sends it to C after being compressed and encoded; mixes the local audio with audio from B and C, and sends it to D after being compressed and encoded; and 4) the ordinary conference members B, C and D receive the mixed audio from the conference chairman A respectively and then broadcast it after being decoded.

Figure 5:
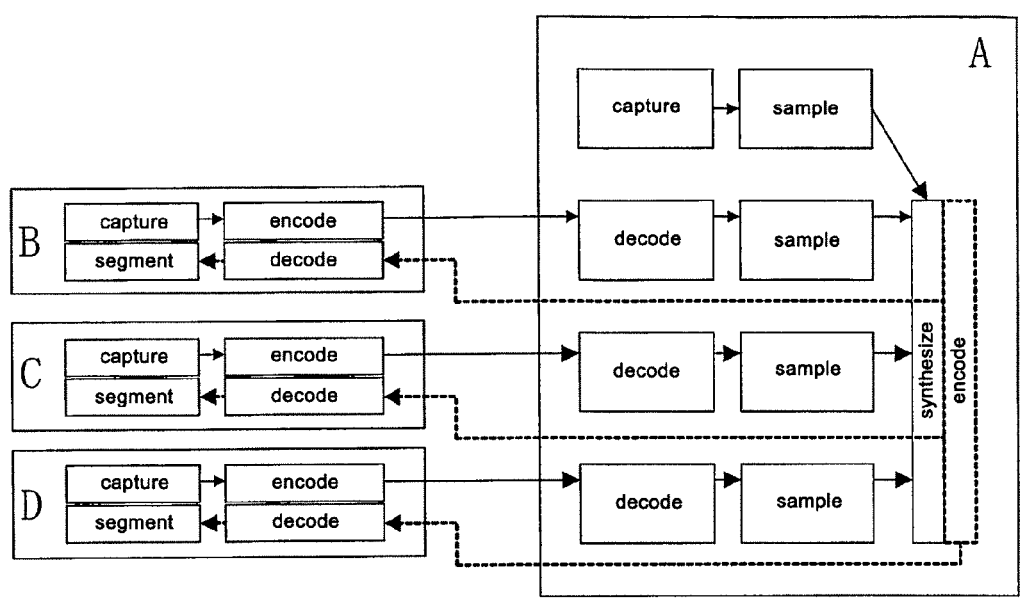
FIG. 5 is the flowing chart of video processing according to the method of this invention.

The video encoding and decoding of this invention employs H.263 standard. The maximum bandwidth is 384 k bps. The process of video processing is shown in FIG. 5:

1) the conference chairman A captures the local video (QCIF format) and sends it back to local for display, and at the same time performs sample processing, with the sample size being from QCIF to one-fourth QCIF;

2) after the conference chairman A receives the three-channel video packets from conference members B, C and D, it decodes them respectively and sends them to local video display window for display;

3) the conference chairman A samples each frame of image after being decoded, the sample size of each frame of image is from QCIF to one-fourth QCIF;

4) the conference chairman A splices four frames of one-fourth QCIF image into one frame of QCIF image;

5) the conference chairman A compresses and encodes the spliced QCIF image and then sends it to conference member B, C and D respectively; and 6) the conference members B, C and D receive the video media packets from the conference chairman A, decode the packets and segment them into three-channel video for display, and at the same time send the locally-captured video to local video display window for displaying respectively. What is needed to point out is that: for those SIP hard terminals behaving as conference members or H.323 terminals, the received video can only be sent directly to the video display window for display, it is impossible to achieve multi-screen display of the image of each conference member at present.

Certainly, this invention can also have various other embodiments besides the above. People skilled in the art, without departing from the spirit and essential of this invention, can make various variation and modification according to this invention, which should also belong to the scope of the appended claims.

INDUSTRIAL APPLICABILITY

This invention is easy and convenient in network construction and the system has a sound practicality and scalability. The calling process of this invention is realized on the basis of SIP protocol and it is relatively simple and unrestrained compared to H.323. Meanwhile, the media control and processing of this invention is done by the user terminal behaving as a conference chairman, therefore it is feasible to construct the system that meets application needs within current NGN networks, as such the operators can realize large scale service promotion and application very conveniently.

The media control of this invention is realized by the soft terminal behaving as the conference chairman, so any user terminals that have registered on the softswitch can launch or join in a multi-channel, multi-point video conference;

The soft terminal of this invention possesses the capability of simultaneously processing multi-channel SIP sessions. Moreover, it has media control functions such as media synthesis, distribution, transmission and segmentation. Certainly, in light of the strong protocol adaptation capability of the softswitch, the terminals used by conference members are not limited to common SIP soft terminals or hard terminals, it is also suitable for H.323 terminals.

The business logic of this invention is controlled by the application server that is built on the basis of Parlay/OSA architecture. Because of the openness of this architecture, the business logic can be realized much more flexible and convenient, therefore meet requirements from different customer groups. Also, the application server has a reliable and flexible charging policy, and can make corresponding charging solution according to the requirements of service and operators.

This invention uses the core device of NGN (next generation network), i.e. the softswitch as the calling process device. It uses the application server that is based on Parlay/OSA standard development to control service logic and segments the video conference into multiple groups of point-to-point SIP session, and combines them ingeniously. In terms of media processing, this invention discards the traditional CIS (client/server) pattern and employs client-to-client architecture. The media processing is dealt by the terminal behaving as the conference chairman, largely expanding the supportive capacity of video conference system. Without adding other devices, this service can be carried out right away within the existing NGN network. For terminal users, it is simple in configuration and convenient in use.

What we claim is:

1. A multi-point video conference system, used in current networks, comprising a softswitch, an application server and terminals, in which:

said application server is used for informing the softswitch to set up a call between a terminal behaving as a conference chairman and terminals behaving as ordinary conference members according to a multi-point video conference request from the terminal behaving as the conference chairman;

said softswitch is used for protocol adaptation and call process, setting up independent calling between the terminal behaving as the conference chairman and the terminals behaving as ordinary conference members;

said terminals include the terminal behaving as the conference chairman and the terminals behaving as ordinary conference members, in which, any terminal registered on the softswitch can be a terminal behaving as ordinary conference members; and the terminal behaving as the conference chairman is a SIP soft terminal with video conference service capability for media controlling: completing media processing, and transmitting processed media to the terminals behaving as ordinary conference members;

wherein the terminal behaving as conference chairman is a software terminal with multi-channel media controlling and processing capability; the terminal behaving as conference chairman includes a SIP module used for SIP session between the softswitch and the application server; the terminal behaving as conference chairman also includes an audio processing module and a video processing module;

the terminal behaving as the conference chairman is used for conference scheduling, including launching the conference, inviting members to join the conference and ending the conference; the terminal behaving as the conference chairman is used to capture local audio and video, and receive audio and video media packets from other conference members, the media packets received will be processed by a media processing unit within the terminal behaving as the conference chairman.

2. The system of claim 1, wherein within the terminal behaving as the conference chairman, the audio processing module is used to capture local audio and receive the audio received from other conference members, as well as synthesize the local audio and the audio received from other conference members and transmit the synthesized audio; the video processing module is used to capture local video and receive the video from other multi-channel conference members, as well as synthesize the local video and the video received from other multi-channel conference members and transmit the synthesized video.

3. The system of claim 1, wherein within the terminals behaving as ordinary conference members, the video processing module is responsible for video segmentation and display.

4. The system of claim 1, wherein calling protocol includes SIP, MGCP or H.248, the terminals are SIP terminal, H.248 terminal or MGCP terminal.

5. A media processing method of a multi-point video conference system, wherein a multi-point video conference request in existing networks is segmented as multiple groups of relatively independent SIP session between a conference chairman and a number of ordinary conference members, each group of session performs call process and media negotiation independently; after the calling and called parties are connected successfully in the multiple groups of SIP calls, a terminal behaving as a conference chairman is for media controlling; completing media processing, and transmitting the processed media stream to numbers of ordinary conference members respectively; said media processing utilizes end-to-end architecture;

wherein the media processing includes audio processing steps and video processing steps, the audio processing steps are as follows: the groups of SIP session performing audio media negotiation independently, after the session being started, the conference chairman receiving the audio from numbers of other conference members simultaneously, then decoding them according to corresponding coding format; and the conference chairman capturing local audio and processing them according to different audio processing schemes for itself and other conference members;

when the conference members comprise a conference chairman and ordinary conference member 1, member 2 and member 3, then the audio processing scheme will be: synthesizing the audio of member 1, member 2 and member 3 and then broadcasting it locally; synthesizing the audio of the chairman, member 2 and member 3, encoding it according to the audio format negotiated between the chairman and member 1, and then transmitting it to member 1; synthesizing the audio of the chairman, member 1 and member 3, encoding it according to the audio format negotiated between the chairman and member 2, and then transmitting it to member 2; synthesizing the audio of the chairman, member 1 and member 2, encoding it according to the audio format negotiated between the chairman and member 3, and then transmitting it to member 3.

6. The method of claim 5, wherein the video processing steps are as follows: within the media negotiation process of multiple groups of SIP session, the conference chairman negotiates the video with a first format; after the session has been set up, the chairman decodes the multi-channel video from other conference members and samples them into a second format the chairman also samples the locally captured video into the second format, then synthesizes the two into one complete frame of video of the first format and sends it to the numbers of other conference members; the conference members decode the received video and then segment out other members' video and display it on multi-screens.

7. The method of claim 6, wherein when the conference members comprise a conference chairman and common conference member 1, member 2 and member 3, said first format is QCIF format, and said second format twe is one-fourth QCIF format.

* * * * *